United States Patent
Koral et al.

(10) Patent No.: US 11,381,594 B2
(45) Date of Patent: Jul. 5, 2022

(54) DENIAL OF SERVICE DETECTION AND MITIGATION IN A MULTI-ACCESS EDGE COMPUTING ENVIRONMENT

(71) Applicant: AT&T Intellectual Property I, L.P., Atlanta, GA (US)

(72) Inventors: Yaron Koral, Cherry Hill, NJ (US);
Arun Jotshi, Parsippany, NJ (US);
Ashwin Sridharan, Edison, NJ (US);
Kartik Pandit, Aberdeen, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 217 days.

(21) Appl. No.: 16/830,694

(22) Filed: Mar. 26, 2020

(65) Prior Publication Data
US 2021/0306372 A1    Sep. 30, 2021

(51) Int. Cl.
*H04L 9/40* (2022.01)
*G16Y 30/10* (2020.01)
(Continued)

(52) U.S. Cl.
CPC .......... *H04L 63/1458* (2013.01); *G16Y 30/10* (2020.01); *H04L 43/16* (2013.01);
(Continued)

(58) Field of Classification Search
CPC . H04L 63/1458; H04L 67/025; H04L 63/101; H04L 63/1416; H04L 41/0654;
(Continued)

(56) References Cited

U.S. PATENT DOCUMENTS

2019/0199613 A1 * 6/2019 Jambur Sathyanarayana .............. H04L 43/16

FOREIGN PATENT DOCUMENTS

CN    105553665 A  *  5/2016
CN    105637891 A  *  6/2016  ............. H04L 43/08
(Continued)

OTHER PUBLICATIONS

Arora et al., "Impact Analysis of Denial of Service (DoS) due to Packet Flooding", 2014 (Year: 2014).*
(Continued)

*Primary Examiner* — Nam T Tran
(74) *Attorney, Agent, or Firm* — Guntin & Gust, PLC; John G. Rauch

(57) ABSTRACT

A device includes a processor and a memory. The processor effectuates operations including monitoring enterprise network traffic associated with one or more user equipment (UE). The processor further effectuates operations including comparing the enterprise network traffic to a UE profile associated with each of the one or more UE. The processor further effectuates operations including determining whether the comparison indicates that a predetermined threshold has been exceeded. The processor further effectuates operations including in response to the indication that the predetermined threshold has been exceeded, generating an alert, wherein exceeding the predetermined threshold is indicative of a denial of service attack on an enterprise network or an attempt to remove enterprise data via the one or more UE.

20 Claims, 13 Drawing Sheets

(51) Int. Cl.
*H04L 67/306* (2022.01)
*H04L 43/16* (2022.01)

(52) U.S. Cl.
CPC ........ *H04L 63/1425* (2013.01); *H04L 63/205* (2013.01); *H04L 67/306* (2013.01)

(58) Field of Classification Search
CPC ... H04L 63/1425; H04L 63/205; H04L 43/16; G16Y 30/10
USPC ......................................................... 726/22
See application file for complete search history.

(56) References Cited

FOREIGN PATENT DOCUMENTS

| CN | 105867266 | A | * | 8/2016 | |
|---|---|---|---|---|---|
| CN | 107295010 | A | * | 10/2017 | |
| CN | 108347411 | A | * | 7/2018 | |
| CN | 104205963 | B | * | 2/2019 | .............. H04W 4/20 |
| CN | 104969612 | B | * | 7/2019 | ............ H04W 28/08 |
| CN | 112585926 | A | * | 3/2021 | .......... G06F 11/0751 |
| CN | 113261244 | A | * | 8/2021 | ......... H04L 41/5051 |
| EP | 2293513 | B1 | * | 9/2014 | ......... H04L 63/1458 |
| GB | 2449852 | A | * | 12/2008 | ......... H04L 63/1416 |
| JP | 2008040726 | A | * | 2/2008 | |
| KR | 20060049821 | A | * | 5/2006 | ......... H04L 63/1458 |
| WO | WO-2007019583 | A2 | * | 2/2007 | ......... H04L 65/1079 |
| WO | WO-2010088550 | A2 | * | 8/2010 | .............. G06F 21/55 |
| WO | WO-2017184189 | A1 | * | 10/2017 | .............. H04L 9/083 |

OTHER PUBLICATIONS

Deshpande et al., "A Network-Based Intrusion Detection System", 2019 (Year: 2019).*
Eshak et al., "Scalable Intrusion Detection System for Cellular Networks", 2013 (Year: 2013).*
Hershey et al., "Procedure for Detection of and Response to Distribution Denial of Service Cyber Attacks on Complex Enterprise Systems", 2012 (Year: 2012).*
Heuer, "Privacy in the semantic web—Social Networks based on XMPP", 2008 (Year: 2008).*
Nassar et al., "Holistic VoIP Intrusion Detection and Prevention System", 2007 (Year: 2007).*
Steven et al., "A Metrics Framework to Drive Application Security Improvement", 2007 (Year: 2007).*
Patel et al., "Detection and Mitigation of DDOS Attack against Web Server", 2014 (Year: 2014).*
Pourmohseni et al., "Detecting Authentication Misuse Attacks Against SIP Entities", 2013 (Year: 2013).*
Scata et al., "Security Analysis and Countermeasures Assessment against Spit Attacks on VoIP Systems", 2011 (Year: 2011).*
Scata et al., "User-Profile Framework against a Spit Attack on VoIP Systems", 2011 (Year: 2011).*
Thakare et al., "Anomaly Detection Based on Access Behavior and Document Rank Algorithm", 2013 (Year: 2013).*
Rajam et al., "Application of IP Traceback Mechanism to Online Voting System", 2012 (Year: 2012).*

* cited by examiner

DENIAL OF SERVICE DETECTION AND MITIGATION IN A MULTI-ACCESS EDGE COMPUTING ENVIRONMENT

TECHNICAL FIELD

This disclosure is directed to a system and method for managing software-defined networks, and, more specifically, to detecting and mitigating attacks on software-defined networks and mobile devices using a virtualized network function.

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. To provide a service, a set of VNFs may be instantiated on general-purpose hardware. Each VNF may require one or more virtual machines (VMs) to be instantiated. In turn, VMs may require various resources, such as memory, virtual central processing units (vCPUs), and network interfaces or network interface cards (NICs).

When the communications network implements fifth generation cellular network technology (5G), utilizing a Control and User Plane Separation (CUPS) is important to 5G networks because it allows operators to separate the evolved packet core (EPC) into a control plane that can reside in a centralized location, for example the middle of the country, and for the user plane to be placed closer to the application it is supporting. This type of separation may be helpful for applications such as, the connected car. In that scenario, a network operator can place the EPC user plane in a data center in a city so that it is closer to the application and therefore reduces the latency. This scenario also works well for high-bandwidth applications like video. Because the core user plane is located closer to the end user the operator does not have to backhaul traffic all the way to central hub and therefore provides more efficient processing.

This background information is provided to reveal information believed by the applicant to be of possible relevance. No admission is necessarily intended, nor should be construed, that any of the preceding information constitutes prior art.

SUMMARY

Disclosed herein is a device having a processor and a memory coupled with the processor. The processor effectuates operations including monitoring enterprise network traffic associated with one or more user equipment (UE). The processor further effectuates operations including comparing the enterprise network traffic to a UE profile associated with each of the one or more UE. The processor further effectuates operations including determining whether the comparison indicates that a predetermined threshold has been exceeded. The processor further effectuates operations including in response to the indication that the predetermined threshold has been exceeded, generating an alert, wherein exceeding the predetermined threshold is indicative of a denial of service attack on an enterprise network or an attempt to remove enterprise data via the one or more UE.

Disclosed herein is a computer-implemented method. The computer-implemented method includes monitoring, by a processor, enterprise network traffic associated with one or more user equipment (UE). The computer-implemented method further includes comparing, by the processor, the enterprise network traffic to a UE profile associated with each of the one or more UE. The computer-implemented method further includes determining, by the processor, whether the comparison indicates that a predetermined threshold has been exceeded. The computer-implemented method further includes in response to the indication that the predetermined threshold has been exceeded, generating, by the processor, an alert, wherein exceeding the predetermined threshold is indicative of a denial of service attack on an enterprise network or an attempt to remove enterprise data via the one or more UE.

Disclosed herein is a computer-readable storage medium storing executable instructions that when executed by a computing device cause said computing device to effectuate operations including monitoring enterprise network traffic associated with one or more user equipment (UE). Operations further include comparing the enterprise network traffic to a UE profile associated with each of the one or more UE. Operations further include determining whether the comparison indicates that a predetermined threshold has been exceeded. Operations further include in response to the indication that the predetermined threshold has been exceeded, generating an alert, wherein exceeding the predetermined threshold is indicative of a denial of service attack on an enterprise network or an attempt to remove enterprise data via the one or more UE.

BRIEF DESCRIPTION OF THE DRAWINGS

Aspects of the herein described telecommunications network and systems and methods are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1:
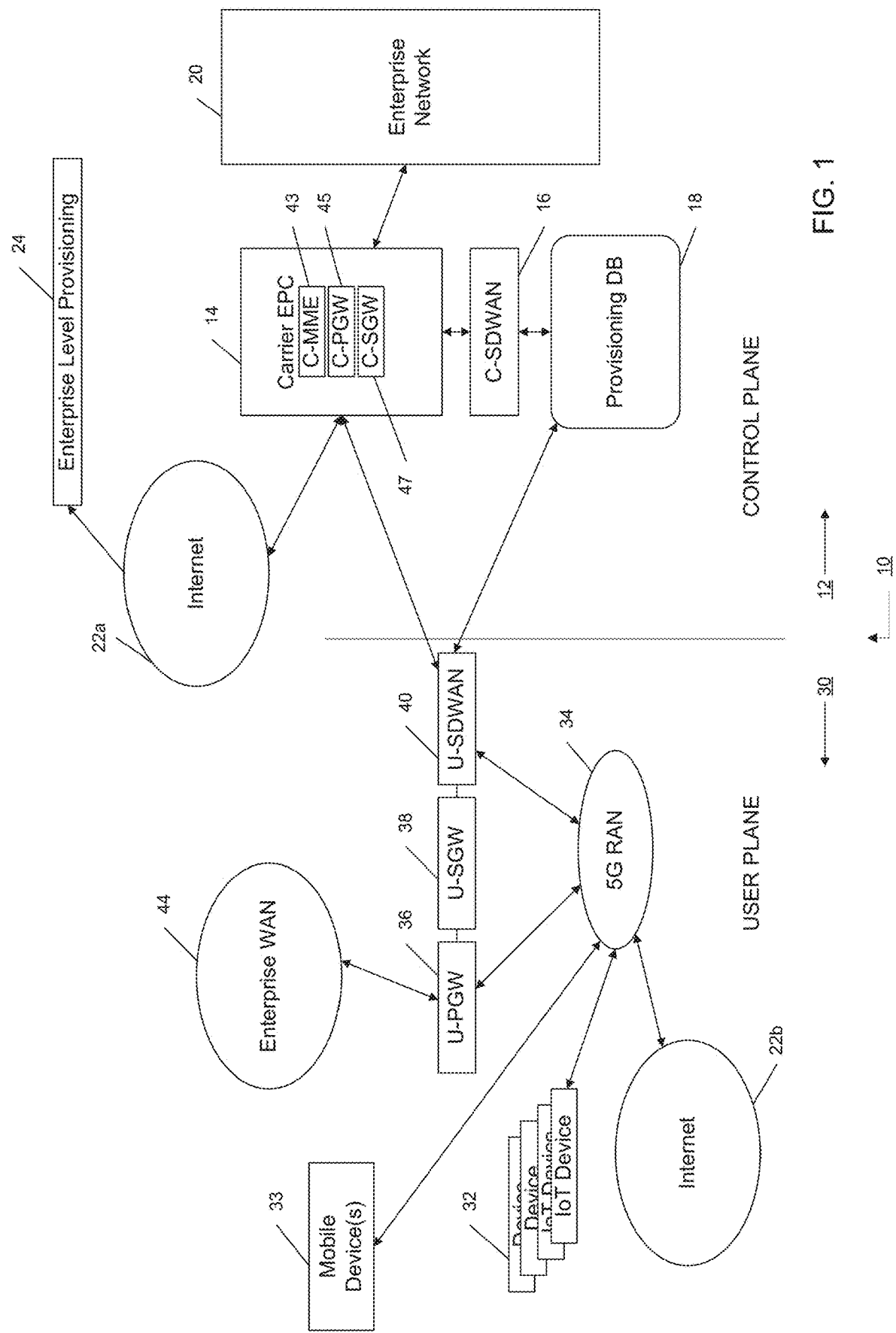
FIG. 1 is a block diagram of an exemplary operating environment in accordance with the present disclosure.

Multi-access edge computing (MEC) is a network architecture concept that enables cloud computing capabilities and an IT service environment at the edge of a cellular network. The basic idea behind MEC is that by running applications and performing related processing tasks closer to the cellular customer, core network data traffic is reduced and applications respond faster due to the reduced physical distance between client and server, and energy can be saved eventually by offloading processing into the cloud despite adding additional communication overhead and latency to the communication. MEC technology is designed to be implemented between cellular base stations (e.g., evolved NodeBs (eNodeBs) or next generation NodeBs (gNodeBs or gNBs)) and a mobile core network. Accordingly, MEC technology enables flexible and rapid deployment of new applications and services for customers. Combining elements of information technology and telecommunications networking, MEC also allows cellular operators to open their radio access network (RAN) to authorized third-parties, such as application developers and content providers.

The internet of things (IoT) may be described as a computing concept describing an idea of physical devices (computing devices, sensors, mechanical and digital machines, etc.) being connected to the Internet and being able to identify themselves to other devices using unique identifiers (UIDs). The physical devices can use their UID and connection to the Internet to transfer data (IoT data) without requiring human-to-human or human-to-computer interaction.

Conventionally, IoT data is extracted from various IoT devices (e.g., smart meters, commercial security systems, traffic monitoring systems, weather monitoring systems, vehicles, smart home devices and sensors), which may utilize different protocols. The extracted IoT data can be sent from an associated IoT device or accessed via the IoT device using a wired or wireless communication network.

Because the IoT devices are connected to the wired or wireless communication network and are often commodity devices which are often mass produced cheaply and utilize low energy technologies to reduce power consumption, security for the IoT device is not a primary concern. Accordingly, IoT devices are increasingly susceptible to hackers, which may not only intercept data sent by the IoT device but may also send commands to the IoT device to control the IoT device.

While the hacking of a single IoT device may not be problematic, issues may be compounded when many (tens, hundreds, thousands, etc.) IoT devices are hacked. A hacker that compromises a set of IoT devices in an MEC environment can use the compromised IoT devices to, for example, attack a local cloud compute environment, attack a wireless network using, for example, signaling storms, relay data, or unnecessarily consume RAN bandwidth. Additionally, hackers may send commands (update, reset, restart, etc.) to the compromised IoT devices of a target (e.g. company, hospital, factory, government, university, etc.) in order to conduct a denial-of-service attack (DoS attack) or a distributed denial-of-service (DDoS) attack on the target.

Accordingly, providing a security component having one or more security elements within the MEC that monitors and processes data and local network traffic while mitigating network attacks may be beneficial. By detecting and mitigating attacks in an MEC environment, greater security and performance for a local network and potentially an entire telecommunications network may be achieved.

The present disclosure includes a security component operating within a MEC environment that can monitor and process the IoT data, mobile device data, or local network traffic in order to detect and mitigate network attacks. Although a system, method, or computer-readable storage medium are described herein in an exemplary configuration in which a security component operates in the MEC architecture, the system, method, or computer-readable storage medium may be deployed at other locations within a network and may be implemented in a non-5G CUPS environment.

On a customer premise side, software-defined network equipment may host multiple VNFs which will be referred to as a user plane SD-WAN gateway (U-SDWAN) 40 (See FIG. 1). The U-SDWAN gateway 40 may be managed by a control plane SDWAN orchestrator (C-SDWAN) 16 in a 5G core network. The U-SDWAN 40 may be logically placed in communication with user plane of the serving gateway (U-SGW) 38 and the user plane 30 of the packet data network gateway (U-PGW) 36 at the customer premises. The U-SDWAN 40 residing in the customer premises may communicate with other U-SDWANs 40 at other customer locations. Multiple VNFs may be established in each U-SDWAN 40 as needed or desired.

On a carrier network side, corresponding control planes may form a part of the Evolved Packet Core (EPC) 14, which may, for example, include the control plane Mobility Management Entity (C-MME) 43, control plane of the serving gateway (C-SGW) 47, and the control plane of the packet data network gateway (C-PGW) 45.

The U-SDWAN 40 may route packets originating from the mobile or fixed 5G RAN 34 to the appropriate destination. In operation in one embodiment, an IoT device may connect with the 5G RAN 34, via a wired connection or a wireless connection, and establish a session with the enterprise network through the EPC 14 by being authenticated by the control plane C-MME 43 and then establishing a session with the C-SGW 47 and C-PGW 45. The IoT device may then establish a session with the U-SGW 38. The U-SGW 38 may forward the data to the U-SDWAN 40 being managed by C-SDWAN 16. The U-SDWAN 40 may establish one or more user plane VNFs. The U-VNF may route the packets to entities outside of the carrier network or to multiple customer locations. The C-SDWAN 16 may provide the policy considerations derived from the enterprise network with intelligence in the U-SDWAN 40 routing the packets through various possible connections. The C-SDWAN 16 may also communicate with other orchestrators outside of the carrier environment and interface with enterprise customers via an external web interface. The C-SDWAN 16 and the U-SDWAN 40 may communicate to update policies as requested by the network or the customer.

Between the customer premise side and the carrier network side, a MEC architecture may allow selected data to remain within an area network (e.g., an enterprise WAN or LAN). The MEC architecture may be located at or near the customer premise side. In operation in one embodiment, an IoT device may connect with the 5G RAN 34, via a RAN intelligent controller (RIC) associated with the MEC architecture and establish a session with the enterprise network through the EPC 14 by being authenticated by the control plane C-MME 43 and then establishing a session with the C-SGW 47 and C-PGW 45. The IoT device may then establish a session with the U-SGW 38. The U-SGW 38 may forward the data to the U-SDWAN 40 being managed by C-SDWAN 16 if the data is not designated as sensitive, personal, proprietary, or otherwise restricted. If the data is designated as sensitive, personal, proprietary, or otherwise restricted, the data is not sent to the C-SDWAN 16 and is processed locally within the area network.

As non-limiting example, the security component within the MEC may include security elements and associated analytics tools. The security component can analyze IoT data from IoT devices connected to a WAN or LAN, a Radio Access Network (RAN), WAN or LAN network traffic to determine a state of a local communications network. The determined state may be indicative of the local communications networks operating normally, indicative of a DOS attack or DDOS attack, one or more IoT devices operating outside of learned behavior parameters, one or more mobile devices being improperly intercepted. The security component may be placed within the MEC, which may be implemented as a plane Virtual Network Function (VNF) that may be placed at or near a customer premises.

FIG. 1 shows an exemplary systems architecture 10 of a 5G CUPS architecture with a network portion 12 and a customer premise equipment (CPE) portion 30. Consistent with the CUPS architecture, the network portion 12 includes one or more control planes having various components and the CPE portion 30 includes a user plane having various components.

While the network portion 12 is described in further detail below, the block diagram of FIG. 1 shows the exemplary network portion 12 as it may be configured in accordance with the present disclosure. On a carrier network side of systems architecture 10 (network portion 12), corresponding control planes may form a network carrier EPC 14. Within the EPC 14, there is shown a control plane of the mobility management entity (MME) (C-MME 43), a control plane of the PGW (C-PGW 45), and a control plane of the SGW (C-SGW 47). The EPC 14 interacts with the enterprise network 20, which may be a private or shared network operated by a network carrier or by an enterprise customer. The EPC 14 may connect with the Internet 22a through a direct connection or through an internet service provider. Provisioning of the EPC 14 and IoT sensors 32 may be performed by the enterprise customer by accessing the enterprise level provisioning interface 24 accessed through the to the Internet 22a. The provisioning may also be done by the network carrier on behalf of an enterprise customer. Note that the Internet portions 22a and 22b of FIG. 1 may be considered to be part of the global Internet; however, Internet portions 22a and 22b are referenced separately herein only for the convenience in describing interface to the Internet with respect to the network portion 12 and the CPE portion 30 of system 10, and the recognition that actual Internet access points may differ between those portions.

There is also shown a C-SDWAN 16. The C-SDWAN 16 may, among other functions, control the policies to be implemented by the network carrier globally or geographically or by individual enterprise customers. The C-SDWAN 16 may be provisioned with provisioning data stored in a provisioning database 18. The C-SDWAN 16 may thus be configured to form part of the EPC 14 or to closely interact with the EPC 14 on the carrier network portion 12. Likewise, the C-SDWAN 16 may be configured to interact with the enterprise customer network 20, the enterprise level provisioning interface 24 and the provisioning database 18. With the C-SDWAN 16 being software-defined, multiple instances of the control plane WAN may be implemented for multiple-enterprise customers or individual customers being serviced by the network carrier.

Turning to the CPE portion 30 of FIG. 1, there is shown the user planes corresponding to the control planes discussed above. There is a U-PGW 36, a U-SGW 38, and a U-SDWAN 40. Each of the U-PGW 36, U-SGW 38, and the U-SDWAN 40 may be in communication with each other, directly or indirectly through one of the interfaces as shown in FIG. 1. The U-PGW 26 and the U-SGW 38 may functionally operate as is known by those skilled in the art of telecommunications using the 5G CUPS architecture. For example, the U-PGW 36 may interface and exchange data with an enterprise wide area network, shown as Enterprise WAN 44. That U-PGW 36 may thus provide a gateway to and from the Enterprise WAN 44 from and to the 5G Radio Access Network (RAN) 34. The 5G RAN 34 may include one or more base stations and operate in conjunction with a RAN Intelligent Controller (MC), illustrated in FIG. 2. The RIC may include a set of functions and interfaces that allow for increased optimizations through policy-driven closed loop automation for faster, more flexible service deployments and programmability within the 5G RAN 34. One or more IoT devices 32 and one or more mobile devices 33 may also access the 5G RAN 34.

There may be one or more U-SDWANs 40 in any architecture. Enterprises may configure the U-SDWANs 40 to meet specific or personalized processing requirements. For example, different U-SDWANs 40 may operate using different policies received from the C-SDWAN 16 described below. There may be different policies for different devices, users, or classes of users. Within each U-SDWAN, one or more U-VNFs may be instantiated.

There may also be a communication interface between the 5G RAN 34 and the internet 22b. As such, there is an established communication path between IoT devices 32 or mobile devices 33 with the enterprise WAN 44 and the Internet 22b. In this example, the enterprise WAN 44 may be a traditional enterprise WAN connecting multiple customer sites through a wide area network. It may be a software-defined WAN which connects enterprise networks including branch offices and data centers over large geographic distances. Those connections may, for example, use broadband internet, 4G, Long-Term Evolution (LTE) or Multiprotocol Label Switching (MPLS) connections. With reference to the U-SDWAN 40, there are shown exemplary connections to the 5G RAN 34, the EPC 14 and, directly or indirectly, to the C-SDWAN 16, and provisioning database 18.

Figure 2:
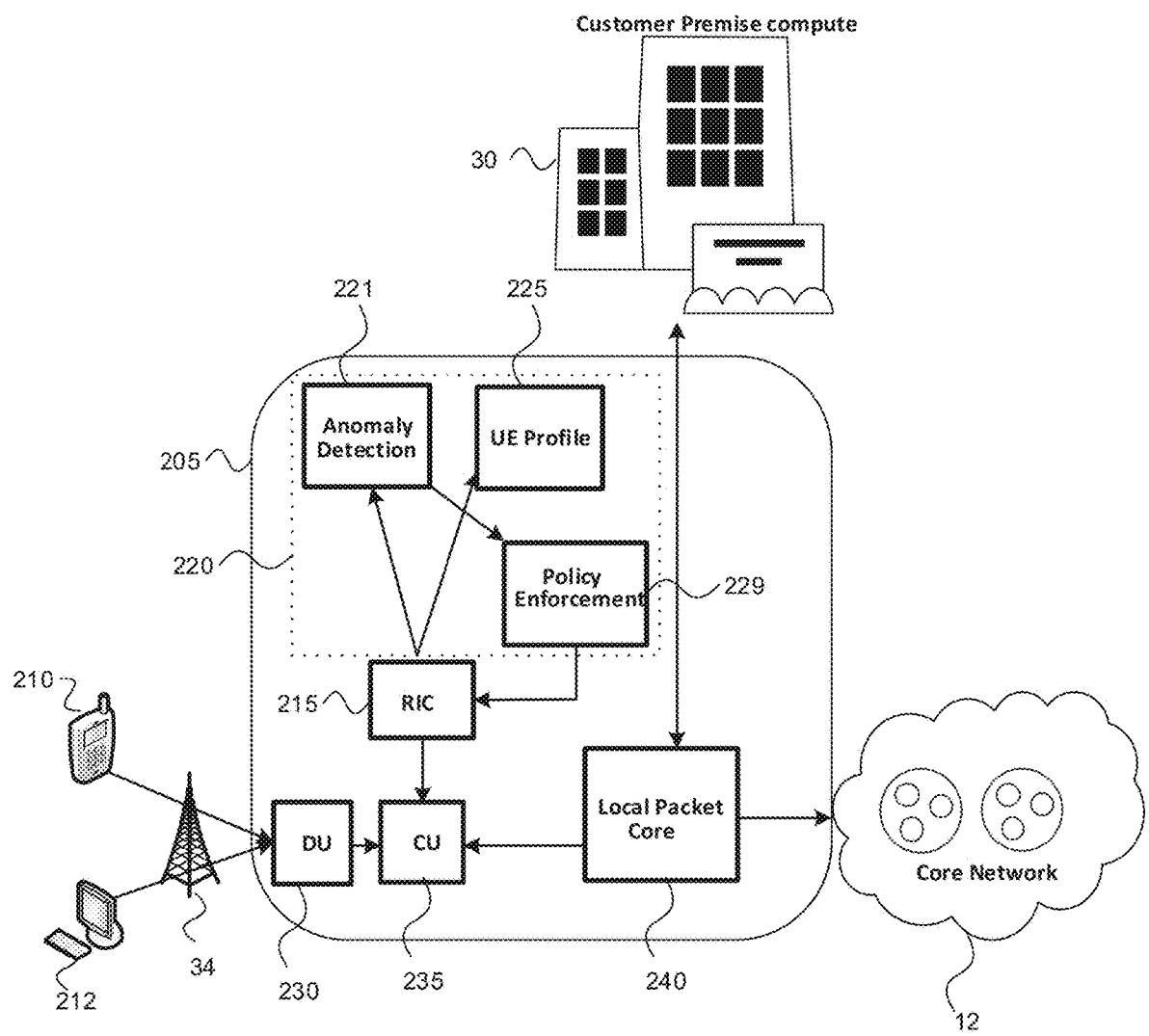
FIG. 2 is a schematic of an exemplary network device in accordance with the present disclosure.

FIG. 2 illustrates an exemplary system architecture 200 including an MEC having a security component according to one or more embodiments. The system 200 may include core network 12, customer premise 30, an enterprise MEC 205, 5G RAN 34, user equipment (UE) 210, and UE 212. The UE 210 and UE 212 may be one or more IoT devices 32 and one or more mobile devices 33, e.g., cellular phones, satellite communication systems, portable digital assistants (PDAs), laptop computers, tablet devices, smart meters, commercial security systems, traffic monitoring systems, weather monitoring systems, vehicles, smart home devices and sensors, and so on. The enterprise MEC 205 may include RIC 215, a security component 220, a distributed unit (DU) 230, a central unit (CU) 235 and a local packet core 240. The local packet core 240 may be associated with the customer premise compute 30 and provide at least a portion of network functions provided by the EPC 14, locally, within an enterprise network (e.g. enterprise network 20). A MEC user plane and a MEC control plane of the enterprise network may be served by the local packet core 240.

The CU 235 may be utilized to direct transmissions across coverage areas, while real time functions are deployed by DU 230, which may be located at a base station of 5G RAN 34 that manages air interface resources between the base station of 5G RAN 34 and UEs (e.g., UE 210 and UE 212). In addition, the MEC user plane and Packet Data Convergence Protocol (PDCP) sublayers may reside at the CU 235, while a radio link control (RLC), media access control (MAC), and PHY layers may reside at the DU 230. The DU 230 may also include a relay device (a.k.a., relay, relay node (RN) and a relay transmission point (rTP).

The security component 220 may include an anomaly detection element 221, a UE profile element 225, and a policy enforcement element 229. The anomaly detection element 221, the UE profile element 225, and the policy enforcement element 229 may each be implemented as a microservice.

The anomaly detection element 221 may detect connections to the enterprise network 20 by the UEs. The anomaly detection element 221 may collect RAN data via the RIC 215 in response to network traffic generated by each of the UEs. The anomaly detection element 221 may monitor the collected RAN data for patterns. For example, the anomaly detection element 221 may monitor trends in control messages (e.g., radio resource control (RRC)) within the RAN data, as well as performance telemetry data. The anomaly detection element 221 may analyze the collected RAN data to detect surges on the enterprise network 20, which may include a large amount of UEs (e.g., greater than 30% of all UEs or greater than 30% of a subset of UEs of a particular UE type) connecting to the enterprise network 20 within a predetermined period (e.g., one minute, 5 minutes, etc.). If a surge is detected, the anomaly detection element 221 may provide an alert that anomalies on the enterprise network have been detected, which may be indicative of the enterprise being a target of an impending or occurring DoS or DDoS attack, as well as provide which UEs have caused the surge.

The UE profile element 225 may collect RAN data via the RIC 215 in response to network traffic generated by each of the UEs. For each UE, the UE profile element 225 may learn about traffic sent or received by the UE 212, times the data is sent or received by the UE 212, data sizes for data sent or received by the UE 212, where data is sent by the UE 212, where data is received from by the UE 212, UE attachment or detachment rates and times from anomaly detection element 221, or other machine-to-machine traffic, which tends to have specific network patterns. The UE profile element 225 may be analyzed to determine a normal communication pattern for the UE (normal behavioral pattern). The determination of a normal behavioral pattern for UEs may be facilitated by various machine learning techniques. The normal behavioral pattern for UEs may be used to establish a normal behavioral pattern for the MEC control plane and the MEC user plane.

The anomaly detection element 221 may also monitor signaling and application events occurring in the enterprise network 20 to associate a UE type (e.g., sensor, thermostat, robot, wireless camera, mobile phone, server, client, storage device, etc.) and UE location to each UE. The UE behavioral pattern, the UE type and the UE location may be stored in the UE profile element 225. A flag may be included in the UE profile element 225 which may be used to indicate UE types that are susceptible to attacks or hacking (e.g. wireless cameras, smart TVs, smart appliances, and other IoT devices).

Upon an occurrence of a UE event or other cause for enterprise network traffic to be received or generated by the UE, the MEC control plane, or the MEC user plane, the anomaly detection element 221 may receive a UE profile for the UE, the MEC control plane, or the MEC user plane related to the UE event or other cause for enterprise network traffic from the UE profile element 225. Event data or traffic data related to the UE event or other cause for enterprise network traffic may be compared to a dynamic threshold associated with a normal behavioral pattern for each UE or UE type, a normal behavioral pattern for the MEC control plane, or a normal behavioral pattern for the MEC user plane, which may be stored in UE profile element 225. If the received event data or enterprise network traffic exceeds the dynamic threshold (e.g., exhibiting a behavior 2-3 standard deviations of a type of data or combinations of types of data from a network wide mean of UEs or UEs of a particular UE type), which may be indicative of an impending or occurring DoS or DDoS attack on the enterprise network or enterprise data removal (e.g., sensitive, personal, proprietary or otherwise restricted data) via a UE (e.g., an IoT device), the anomaly detection element 221 may indicate an abnormal behavioral pattern for the one or more UEs, the MEC control plane or the MEC user plane. For example, if a factory has 100 IoT devices, the anomaly detection element may compare behavioral aspects of the 100 IoT devices to a normal behavior pattern for the IoT devices (e.g., update, reset, restart, etc.) when determining DoS or DDoS attacks. If more than 2-3 standard deviations from the mean of 100 IoT devices (27 IoT devices or greater) perform a reset at the same time, the anomaly detection element 221 may determine that the predetermined threshold has been exceeded, indicating an abnormal behavioral pattern for the 100 IoT devices. If an abnormal behavioral pattern is determined from the comparison, the anomaly detection element 221 may generate an alert indicating that one or more UEs, the MEC control plane or the MEC user plane have an abnormal behavioral pattern. It is contemplated that the standard deviation may be calculated using any type or combination of types of data associated with one or more UEs or MECs (e.g., signal strength, number of resets, CPU percentage, bandwidth, etc.).

The policy enforcement element 229 may receive alerts and associated information about one or more UEs, the MEC control plane or the MEC user plane that have been determined to have an abnormal behavioral pattern by the anomaly detection element 221. The policy enforcement element 229 may analyze the information about one or more UEs, the MEC control plane or the MEC user plane causing the alert to determine if the abnormal behavioral pattern is indicative of an impending or occurring DoS or DDoS attack.

For example, the policy enforcement element 229 may determine that a number of UEs of a given UE type are simultaneously restarting, have stopped, have started, are operating outside of a normal operating time, are sending an abnormal amount of data, are receiving an abnormal amount of data, etc., and conclude that a DoS or DDoS attack is imminent or occurring. In response to the policy enforcement element 229 concluding that a DoS or DDoS attack is imminent or occurring, the policy enforcement element 229 may implement one or more actions to prevent or mitigate the DoS or DDoS attack. The one or more actions may be performed on the UEs causing the alert or the enterprise network in general. For example, the policy enforcement element 229 may block connection attempts by selected UEs (tagged UEs), rate limit the selected UEs using the RIC 215, isolate the selected UEs by lowering quality of service for the selected UEs, report and tear down an existing connection to selected UEs. The policy enforcement element 229 may tag one or more UEs that have an abnormal behavioral pattern, which can be stored in an associated UE profile by the UE profile element 225.

In another example related to DoS or DDoS mitigation, the anomaly detection element 221 may have been monitoring a smart grid of an enterprise to determine anomalous behavior by UEs associated with the smart grid (e.g., network reattachment times and number of reattachment occurrences by each of the UEs). In this example, the anomaly detection element 221 may determine based on UE profiles received from the UE profile element 225 that a normal behavioral pattern for UEs associated with the smart grid is for each UE to reattach to the enterprise network 20 on average once a day to transmit short bursts of data which consumes 5% of a total time for each UE, while each UE remains idle for 95% of the total time. If the anomaly detection element 221 determines that reattachment is occurring at a rate that consumes 10% of a total time (traffic surge), which is twice the rate of a normal behavior for each UE based on an associated UE profile, the anomaly detection element 221 may determine that an abnormal behavioral pattern is occurring, which may be indicative of a DoS or DDoS attack and provide an alert. The alert may be received by the policy enforcement element 229 which may implement one or more mitigation actions in response to the alert. The one or more mitigation actions may, for example, include at least one of: blocking connection attempts to UEs, rate limiting traffic to mitigate a traffic surge, isolating UEs (e.g., lowering a quality of service (QoS) for the UE), reporting the abnormal behavioral pattern of the UEs, and tear down existing connection to the UEs (e.g., de-allocation of network resources, contexts and sending error messages to network elements). Accordingly, the anomaly detection element 221 may be utilized to determine behavioral patterns occurring within a MEC control plane and user plane and establish a normal behavior for the MEC control plane and user plane from which the dynamic thresholds (e.g., a particular standard deviation threshold or UE performance threshold) may be derived and enforced in DoS or DDoS mitigation.

In addition to DoS or DDoS mitigation, the security component 220 may provide enterprise data removal mitigation. The enterprise data removal mitigation may be in response to a hacker attempting to obtain sensitive data for an enterprise by infiltrating an enterprise network via a UE. The policy enforcement element 229 may receive alerts and associated information about one or more UEs that have been determined to have an abnormal behavioral pattern by the anomaly detection element 221. The policy enforcement element 229 may analyze the information about one or more UEs that have been tagged to determine if the abnormal behavioral pattern is indicative of enterprise data removal via a UE. In response to the policy enforcement element 229 concluding that an attempt to remove enterprise data via a UE is occurring, the policy enforcement element 229 may apply one or more policies to prevent enterprise data exfiltration (e.g., identifying UEs exhibiting anomalous behavior and populating a blacklist including the UEs exhibiting anomalous behavior in which the RIC 215 may utilize to inspect new UE attachments or an existing UE session). The one or more policies may include the one or more actions described in reference to the DoS or DDoS mitigation. In addition, the one or more actions may include the one or more polices in regard to enterprise data removal mitigation.

For example, factory robots, which may be IoT devices, may communicate from certain locations at certain times of a day using a specific communication pattern (normal behavioral pattern). If one or more factory robots are communicating at a time outside of what has been determined to be within the normal behavioral pattern for the factory robots, or one or more factory robots are communicating to/from locations different than those associated with the normal behavioral pattern, the anomaly detection element 221 may determine that an abnormal behavioral pattern is occurring, which may be indicative of an attempt to remove enterprise data via a UE and provide an alert. The alert may be received by the policy enforcement element 229 which may implement one or more enterprise data removal mitigation policies in response to the alert. Accordingly, the anomaly detection element 221 may be utilized to determine behavioral patterns occurring within one or more UEs and establish a normal behavior for the one or more UEs from which the dynamic thresholds may be derived and enforced in enterprise data removal mitigation. For example, the anomaly detection element 221 may compare a behavioral aspects of a UE (e.g., times the data is sent or received by the UE, data sizes for data sent or received by the UE, where data is sent by the UE, where data is received from by the UE, UE attachment or detachment rates and times from anomaly detection element 221, or other machine-to-machine traffic) and if, for example, more than two of the six behavioral aspects have occurred, at the same time, the anomaly detection element 221 may determine that the predetermined threshold has been exceeded, indicating an abnormal behavioral pattern for the UE.

In addition to DoS or DDoS mitigation and enterprise data removal mitigation, the security component 220 may provide mobile device data interception mitigation. The mobile device may be, for example, a cellular telephone. The mobile device data interception mitigation may be in response to an attacker attempting to obtain sensitive data for a person or an enterprise via an associated mobile device using a surveillance device (e.g., a Stingray or an International Mobile Subscriber Identity (IMSI) catcher). Stingrays and IMSI catchers are cell phone surveillance devices that mimic cell phone towers and send out signals to tricking cell phones in the area to disconnect from their service provider cell site or base station and establish a new connection with the Stingray or IMSI catcher. In most cases, this may be accomplished by having the Stingray or IMSI catcher broadcast a signal that is either stronger than, or made to appear stronger than, the signals being broadcast by service provider cell sites or base stations operating in the area. Once connected to the Stingray or IMSI catcher, communication of content in which one or more targets believe is being transmitted over-the-air between a target cellular device and their service provider cell site or base station may be intercepted in order to obtain mobile device data (e.g., an IMSI, sensitive, personal, proprietary, or otherwise restricted data).

In order to mitigate mobile device data interception attacks, the security component 220 may monitor signal power measurements of mobile devices 33 connected to 5G RAN 34. Signal power measurements may be associated with a signal power between a mobile device and a cell tower, which may roughly indicate a distance between the mobile device and cell tower. The anomaly detection element 221 may apply analytics (e.g., a time series anomaly detection method that tracks Reference Signals Received Power (RSRP) (power measurements) from eNBs/gNBs in a region and detects eNBs/gNBs that are active for short time periods) in order to detect abnormalities in operations for the mobile device 33 (e.g., entities id, location, and operation patterns). The security component 220 may store a signal power threshold value, which may be compared to the monitored signal power measurements to determine anomalies which may be an attempt to intercept content (e.g. sensitive or personal data) by an attacker via the mobile device. The security component 220 may receive signal power measurements from the one or more mobile devices 33. The signal power measurements may be associated signal power measurements between each of the one or more mobile devices 33 and one or more cell towers. For example, if the security component 220 receives signal power measurements from a mobile device 33 indicating the existence of 5 cell towers in the vicinity of the mobile device 33, but the security component 220 knows that the mobile device 33 should be sending signal power measurements from 4 cell towers based on a determined location of the mobile device and knowledge of network cell tower locations, the security component 220 may determine that an anomaly has been detected. Accordingly, the signal power threshold value may be associated with exceeding a number of signal power measurements expected based on a location, (e.g., receiving 5 signal power measurements instead of 4 signal power measurements).

In response to detected anomalies, the anomaly detection element 221 may provide an alert. The policy enforcement element 229 may receive alerts and associated information about the one or more mobile devices 33. The policy enforcement element 229 may analyze the information about the one or more mobile devices 33 to determine if a Stingray, IMSI catcher or other intercepting device is being used in the vicinity of the one or more mobile devices 33. If the policy enforcement element 229 determines that a Stingray or IMSI catcher in the vicinity of the one or more mobile devices 33, the policy enforcement element 229 may implement one or more mobile device data interception mitigation policies (e.g., sending an alert to the mobile device user, sending an alert to a location or venue manager, or flagging the one or more mobile devices 33 as potential compromised mobile devices 33 which should be tracked in order to mitigate damage that could be caused by the one or more compromised mobile devices 33 to an enterprise network.

Figure 3:
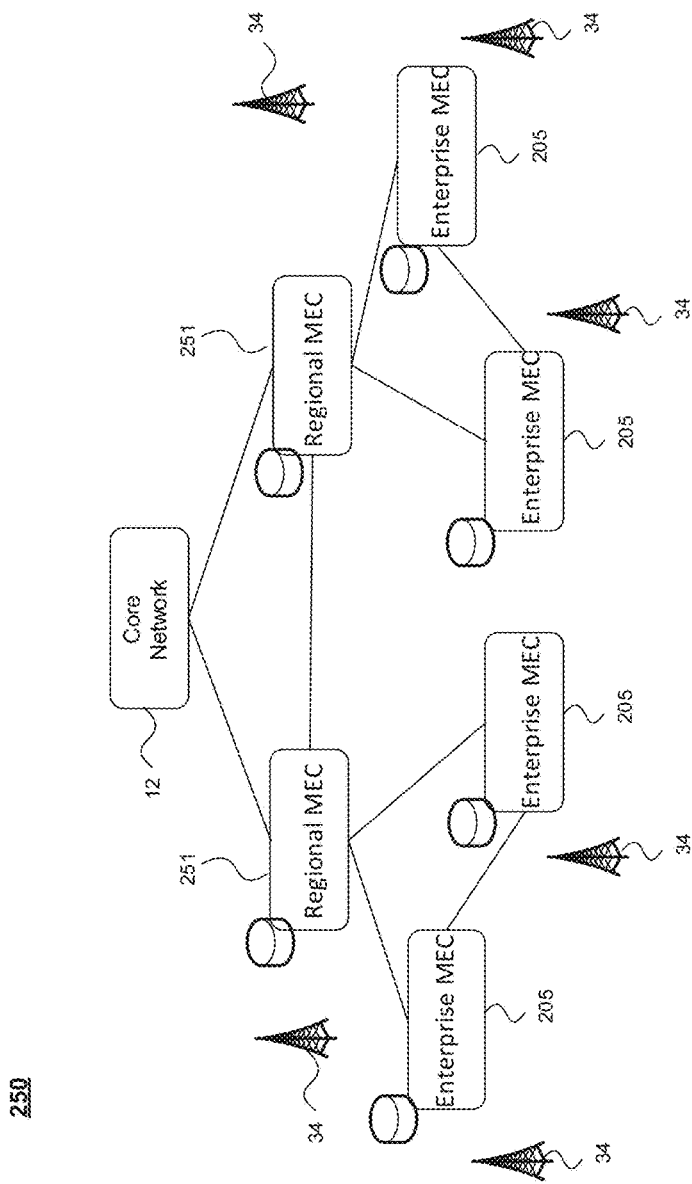
FIG. 3 is a schematic of an exemplary system architecture in accordance with the present disclosure.

FIG. 3 illustrates an exemplary system architecture 250 according to one or more embodiments. The system 250 may be a telecommunications network having a distributed MEC architecture, which may include core network 12, one or more 5G RANs 34 or base stations of a 5G RAN 34, one or more regional MECs 251 each of which may include a security component, and one or more enterprise MECs 205. The one or more regional MECs 251 may be used to retain data of an enterprise within a region for processing instead of processing at the core network 12. The one or more regional MECs 251 may be connected to the core network 12 and may be connected to one or more enterprise MECs 205. Each regional MEC 251 may communicate with other regional MECs 251. As illustrated herein, enterprise MECs 205 may communicate with other enterprise MECs 205 when the MECs 205 are related to a common enterprise or business entity (e.g. company, hospital, factory, government, university, etc.).

Because each MEC (205 or 251) includes a security component, abnormal behavioral patterns for an associated control plane, an associated user plane, or associated UEs detected by an anomaly detection element 221 of an MEC (an affected MEC) may be communicated to other MECs that are connected to the affected MEC in response to the detection of abnormal behavioral patterns (e.g., an alert). The other MECs (205 or 251) connected to the affected MEC may implement one or more mitigation actions on traffic sent by the affected MEC to isolate the affected MEC that is potentially under a DoS or DDoS attack, or one or more enterprise data removal mitigation policies in response to an attempt to remove enterprise data via a UE. In addition, the other MECs (205 or 251) may also implement one or more mitigation actions on all received traffic or a subset of all traffic or adjust traffic thresholds for the other MECs.

Figure 4:
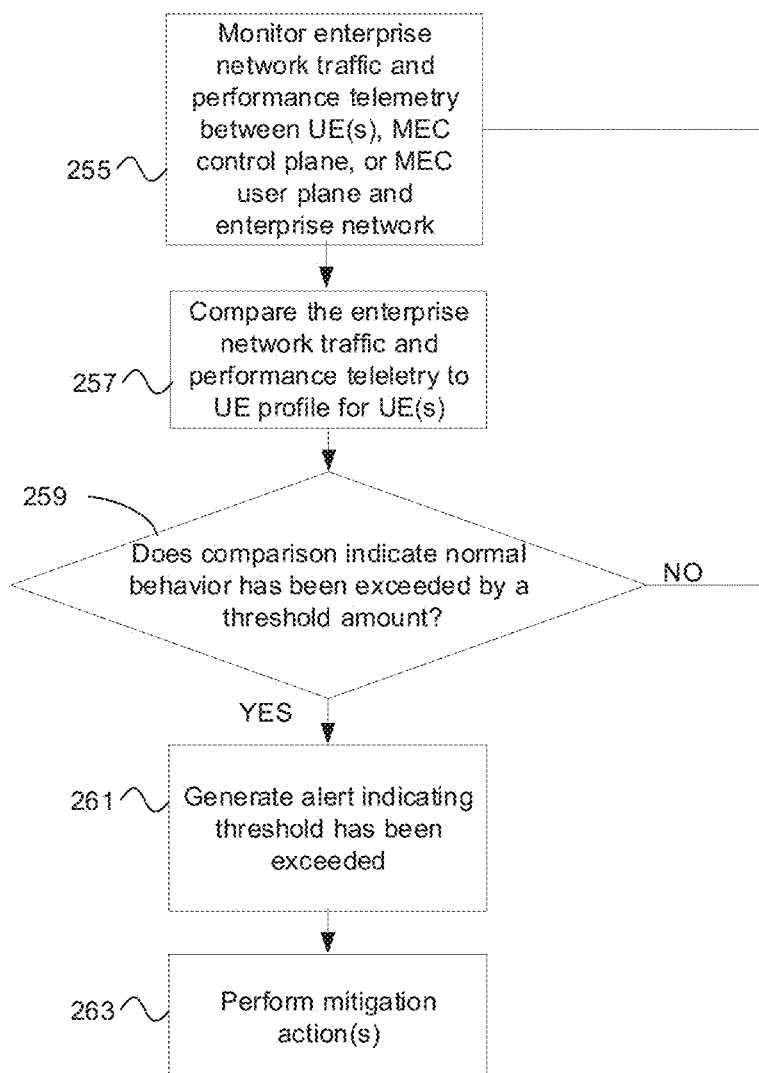
FIG. 4 is a flowchart of an exemplary method of operation for the architecture described in FIG. 2.

An exemplary operational flowchart in accordance with a method of the present disclosure is illustrated in FIG. 4, which may be utilized for DoS or DDoS mitigation or enterprise data removal mitigation. At block 255, in a first example, a security component 220 within MEC 205, may monitor enterprise network traffic (e.g., control messages, such as radio resource control) and performance telemetry between UEs. In a second example, the security component 220 within MEC 205, may monitor enterprise network traffic and performance telemetry between MEC control plane and an enterprise network. In a third example, the security component 220 within MEC 205, may monitor enterprise network traffic and performance telemetry between a MEC user plane and an enterprise network. At block 257, the security component 220 may compare the enterprise network traffic and the performance telemetry to a UE profile for the one or more UEs. The UE profile may include normal behavioral data related to operation of the one or more UEs or a UE type associated with the one or more UEs. The security component 220 may also compare the enterprise network traffic and the performance telemetry to normal behavioral data related to operation of the MEC control plane or MEC user plane. The comparisons may be used to determine whether a DoS or DDoS attack has occurred or is imminent, or an attempt to remove enterprise data via a UE is occurring. At block 259, the security component 220 may determine whether the comparison of the enterprise network traffic and the performance telemetry to the UE profile for the one or more UEs, the MEC control plane or the MEC user plane exceeds a predetermined threshold indicating abnormal behavior for the one or more UEs, MEC control plane or the MEC user plane. At block 261, the security component 220 may generate an alert in response to the monitored enterprise network traffic and the performance telemetry exceeding the predetermined threshold. At block 263, the security component 220 may perform one or more mitigation actions to mitigate the DoS or DDoS attack or implement one or more policies to prevent enterprise data exfiltration from the one or more UEs.

Figure 5:
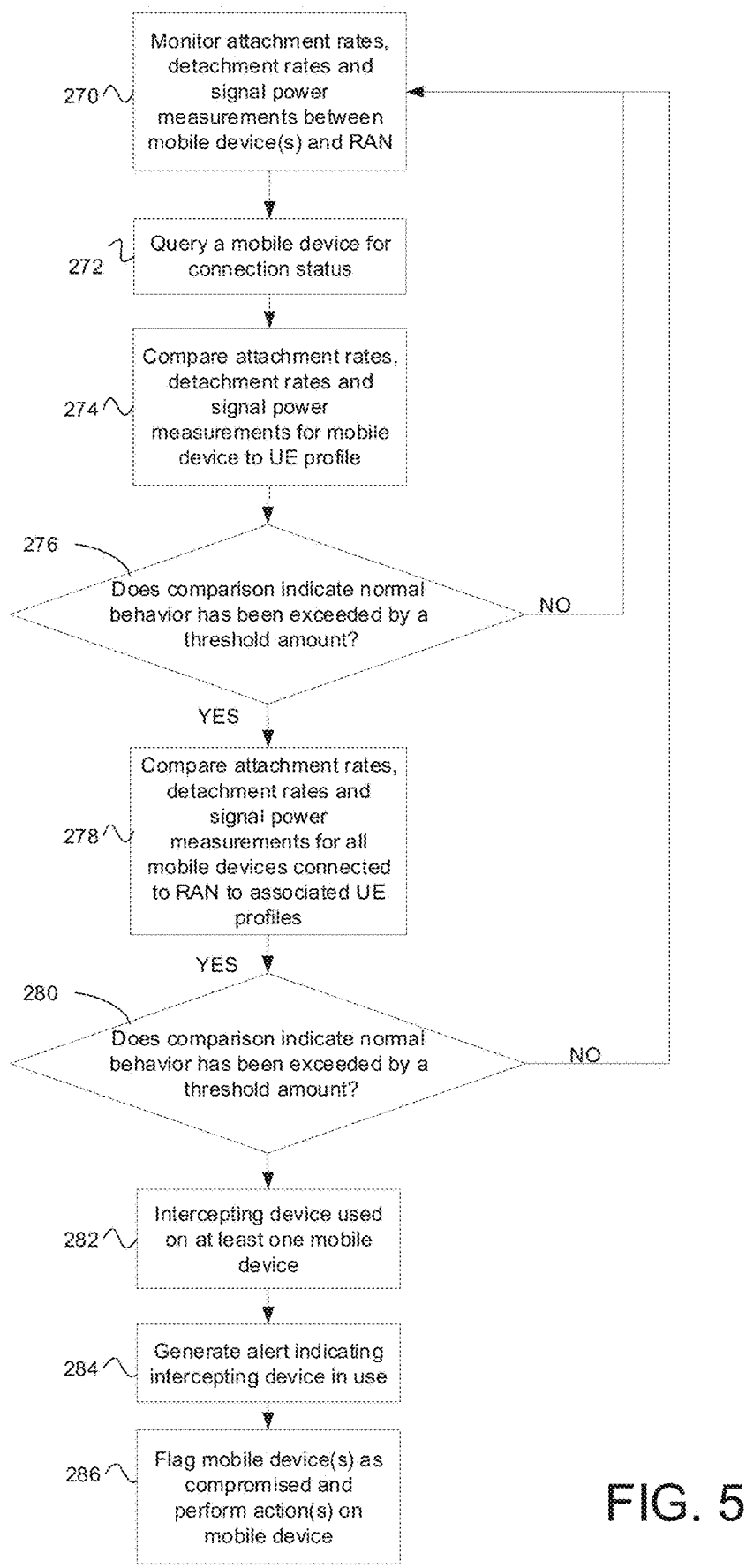
FIG. 5 is a flowchart of an exemplary method of operation for the architecture described in FIG. 2.

An exemplary operational flowchart in accordance with a method of the present disclosure is illustrated in FIG. 5. At block 270, a security component 220 within MEC 205, may monitor attachment rates of mobile devices 33 connecting to 5G RAN 34, detachment rates of mobile devices 33 disconnecting from 5G RAN 34 and signal power measurements of mobile devices 33 connected to 5G RAN 34. At block 272, the security component 220 may periodically query a mobile device 33 to determine whether the mobile device is still connected to the 5G RAN 34 or whether the mobile device 33 has reattached to the 5G RAN 34 in an abnormal manner (e.g., the mobile device 33 reattached at a rate that is three standard deviations or more from a measured network wide attach rate). At block 274, the security component 220 may compare the attachment rates of the mobile device 33 connecting to the 5G RAN 34, the detachment rates of the mobile device 33 disconnecting from the 5G RAN 34 and the signal power measurements of the mobile device 33 connected to the 5G RAN 34 to a UE profile for the mobile device 33, which includes normal behavioral data for the mobile device (e.g., a normal attachment rate for the mobile device 33 connecting to 5G RAN 34, a normal detachment rate for the mobile device 33 disconnecting from 5G RAN 34, and a normal disconnection time for the mobile device 33 disconnecting from 5G RAN 34). The normal attachment rate for the mobile device 33 connecting to 5G RAN 34, the normal detachment rate for the mobile device 33 disconnecting from 5G RAN 34, and the normal disconnection time for the mobile device 33 disconnecting from 5G RAN 34 may be obtained by applying machine learning to attachment and detachment rates for a given mobile device. At block 276, the security component 220 may determine whether the comparison of the attachment rates and detachment rates of the mobile device 33 and the signal power measurements of the mobile devices 33 to the UE profile for the mobile device 33 exceeds a predetermined threshold indicating abnormal behavior for the mobile device 33. If the security component 220 determines from the comparison that the attachment rates, detachment rates, or signal power measurements for the mobile device 33 do not exceed the predetermined threshold, the method returns to block 270.

At block 278, if the security component 220 determines from the comparison that the attachment rates, detachment rates, or signal power measurements for the mobile device 33 exceeds the predetermined threshold, the security component 220 may compare the attachment rates of mobile devices 33 connecting to the 5G RAN 34, the detachment rates of mobile devices 33 disconnecting from the 5G RAN 34 and the signal power measurements of mobile devices 33 connected to the 5G RAN 34 to a UE profile for each mobile device 33 connected to the 5G RAN 34. At block 280, the security component 220 may determine whether the comparison of the attachment rates of mobile devices 33 connecting to the 5G RAN 34, the detachment rates of all mobile devices 33 disconnecting from the 5G RAN 34, or the signal power measurements of mobile devices 33 connected to the 5G RAN 34 exceeds the predetermined threshold indicating abnormal behavior for the mobile devices 33 or a predetermined subset (e.g. percentage). If the security component 220 determines from the comparison that the attachment rates or detachment rates for all or the predetermined subset of the mobiles devices 33 connected to the 5G RAN 34 do not exceed the normal behavioral data associated with each mobile device 33 by a predetermined threshold, the method returns to block 270.

At block 282, if the security component 220 determines from the comparison that the attachment rates or detachment rates for all or the predetermined subset of the mobiles devices 33 connected to the 5G RAN 34 exceed the normal behavioral data associated with each mobile device 33 by a predetermined threshold, the security component 220 may conclude that a Stingray, IMSI catcher, or other intercepting device is being used. At block 284, in response to the security component 220 concluding that a Stingray, IMSI catcher, or other intercepting device is being used in the vicinity of the mobile device(s) 33, the security component 220 may generate and send an alert that an intercepting device is being used. The alert may additionally include the mobile device(s) 33 that may be compromised, a time for the alert, and where the compromised mobile device(s) 33 are located. The alert may be sent to the mobile devices 33 which may be associated with a user (e.g., an employee of a location using MEC 205). At block 286, the security component 220 may also flag the one or more mobile devices 33 as potential compromised devices and rate limit each flagged mobile device 33 using the RIC 215.

Accordingly, the present disclosure provides a system that may mitigate DoS or DDoS attacks, exfiltration of data from user equipment (UE) (e.g., an IoT device or mobile device), and mitigate intercepting content from mobile devices. The system may utilize an anomaly detection element, a UE profile element, and a policy enforcement element. The anomaly detection element may monitor trends of control messages (i.e. e.g., radio resource control (RRC)), as well as performance telemetry in order to determine anomalous behavior by the UE. The anomaly detection element may provide alerts for any anomalous traffic load, as well as which user equipment or mobile device is the cause for the alert. The UE profile element may be utilized to obtain (e.g., discover) normal communication patterns for connected devices (UE). The policy enforcement element may receive alerts from the anomaly detection element and based on information from the UE profile decide on which actions or policies to perform in response to determining that UE, or a control plane, or a user plane that may be compromised. The actions may include one of: blocking connection attempts by the user equipment (e.g., preventing the UE from connecting to other UEs or portions of a network), rate limiting the user equipment to control a rate of requests sent or received by the user equipment or the mobile devices, isolating (lower quality of service (QoS)) by assigning a lower priority to the UE to reduce the amount of bandwidth the UE is allowed to consume, reporting and tearing down an existing connection of the user equipment. The system supports different detection algorithms as well as different schemes for normal communication patterns of different user equipment types (e.g., sensors, factory robots, smart thermostats, etc.). The system supports distributed deployments in several MEC sites in a telecommunications network, where each instance runs its own "local intelligence" as well as coordinating alerts and actions with other MEC sites.

The system may also be used to mitigate mobile device data interception attacks. The system may monitor signal power measurements for mobile devices connected to an enterprise network. Based on the signal power measurements, the system may apply analytics that can be used to detect abnormal patterns in the operation for the mobile devices. In response to detecting abnormal patterns for the mobile devices, the system may alert an IT operator associated with the MEC, tag affected devices using an associated UE Profile for the mobile devices, and rate limit the affected mobile devices using the RIC.

It is contemplated herein that in an SDN environment (e.g., an environment in which the typical set of "devices" are white-boxes whose functionality is determined by software enablement), what had previously been described as a "node" takes on a different realization. In an SDN environment, a node may include a single white-box or a cluster (more than one, cooperating or independent) of white-boxes. As such, when the term node is used, a "cluster node" is a potential realization.

Figure 6:
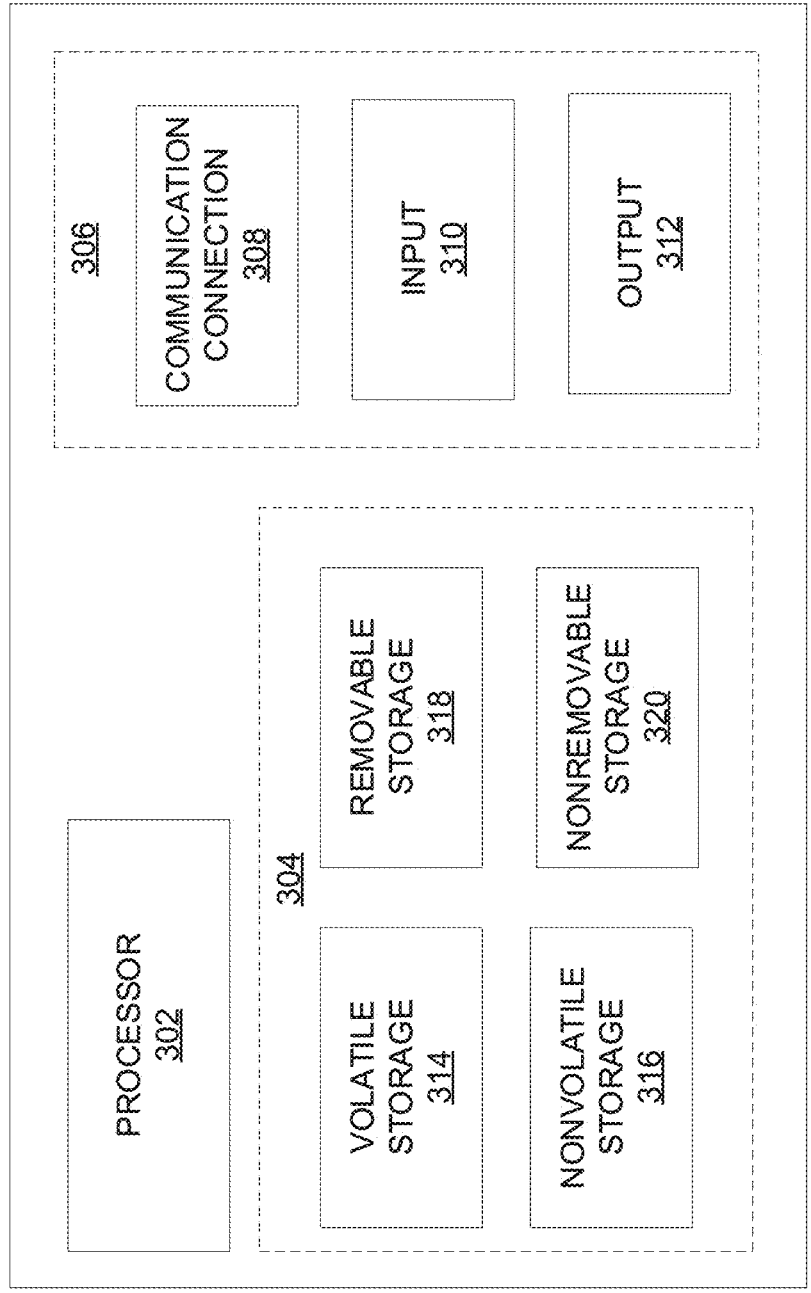
FIG. 6 is a schematic of an exemplary network device.

FIG. 6 is a block diagram of network device 300 that may be connected to or comprise a component of edge computing node or connected to edge computing node via a network (e.g., core network 12 of FIG. 1). Network device 300 may comprise hardware or a combination of hardware and software. The functionality to facilitate telecommunications via a telecommunications network may reside in one or combination of network devices 300. Network device 300 depicted in FIG. 6 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 6 is exemplary and not intended to imply a limitation to a specific implementation or configuration. Thus, network device 300 may be implemented in a single device or multiple devices (e.g., single server or multiple servers, single gateway or multiple gateways, single controller, or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 6) to allow communications therebetween. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 7:
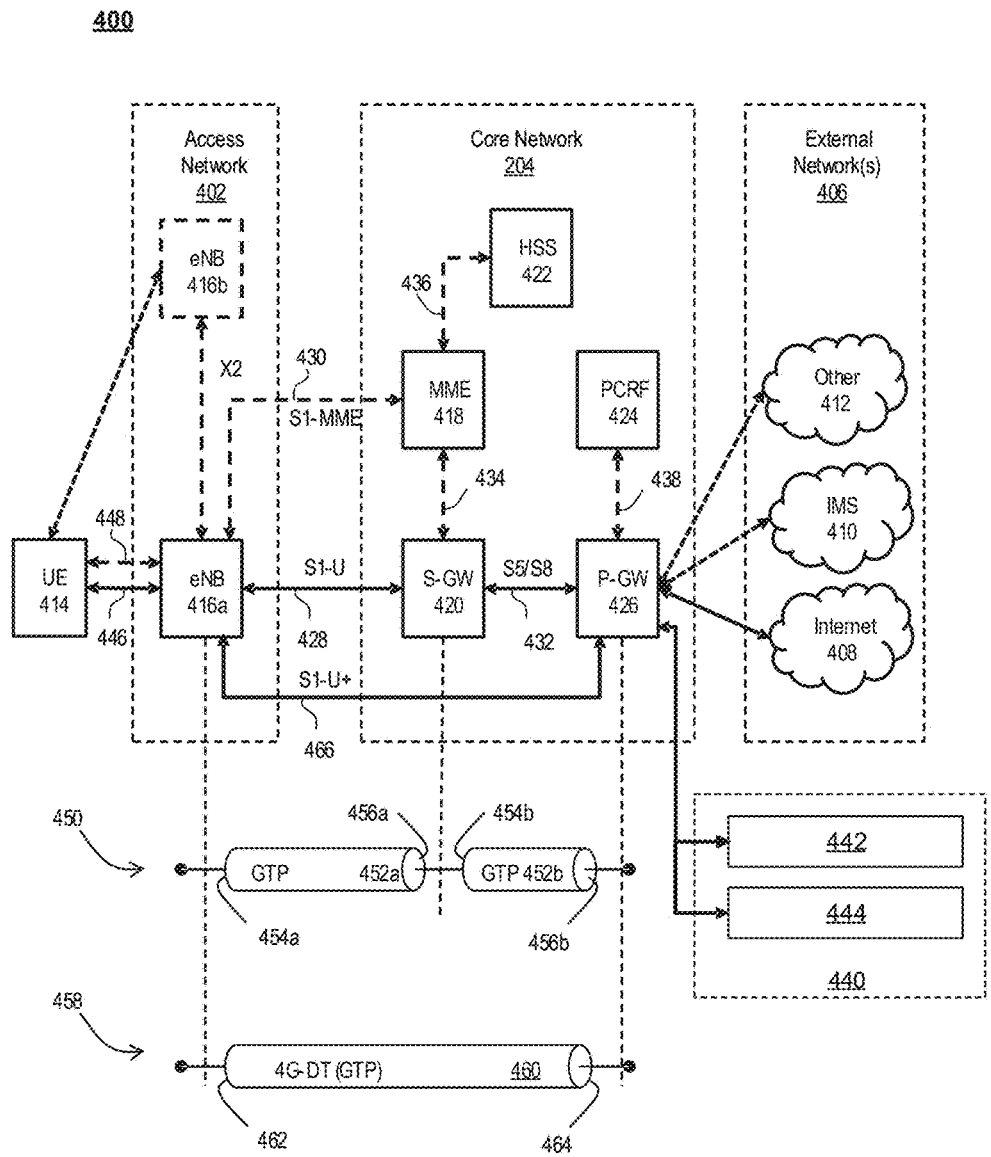
FIG. 7 depicts an exemplary communication system that provide wireless telecommunication services over wireless communication networks with which edge computing node may communicate.

FIG. 7 illustrates a functional block diagram depicting one example of an LTE-EPS network architecture 400 related to the current disclosure. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (eNodeB), with which UE 414 communicates over the air and wirelessly. UEs 414 can include, without limitation, wireless devices, e.g., satellite communication systems, portable digital assistants (PDAs), laptop computers, tablet devices, Internet-of-things (IoT) devices, and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media, and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths or interfaces are terms that can include features, methodologies, or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, HSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416*a* and PGW 426. Notably, S1-U+ path/interface does not include SGW 420, a node that is otherwise instrumental in configuring or managing packet forwarding between eNB 416*a* and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory or disk drive. It is understood that storage device 440 can include registers suitable for storing address values. Alternatively or in addition, storage device 440 can be separate from PGW 426, for example, as an external hard drive, a flash drive, or network storage.

Storage device 440 selectively stores one or more values relevant to the forwarding of packet data. For example, storage device 440 can store identities or addresses of network entities, such as any of network nodes 418, 420, 422, 424, and 426, eNBs 416 or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, or other data structures generally well understood and suitable for maintaining or otherwise manipulate forwarding addresses on a per bearer basis.

It should be noted that access network 402 and core network 404 are illustrated in a simplified block diagram in FIG. 7. In other words, either or both of access network 402 and the core network 404 can include additional network elements that are not shown, such as various routers, switches, and controllers. In addition, although FIG. 7 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416*a*, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416*a*, a second portion (e.g., an S1 data bearer 428) between eNB 416*a* and SGW 420, and a third portion (e.g., an S5/S8 bearer 432) between SGW 420 and PGW 426. Various signaling bearer portions are also illustrated in FIG. 7. For example, a first signaling portion (e.g., a signaling radio bearer 448) between UE 414 and eNB 416*a*, and a second signaling portion (e.g., S1 signaling bearer 430) between eNB 416*a* and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address, and a user datagram protocol port number. Within a particular tunnel connection, payloads, e.g., packet data, which may or may not include protocol related information, are forwarded between tunnel endpoints.

An example of first tunnel solution 450 includes a first tunnel 452*a* between two tunnel endpoints 454*a* and 456*a*, and a second tunnel 452*b* between two tunnel endpoints 454*b* and 456*b*. In the illustrative example, first tunnel 452*a* is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two-tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. For example, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual basis. For example, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 8:
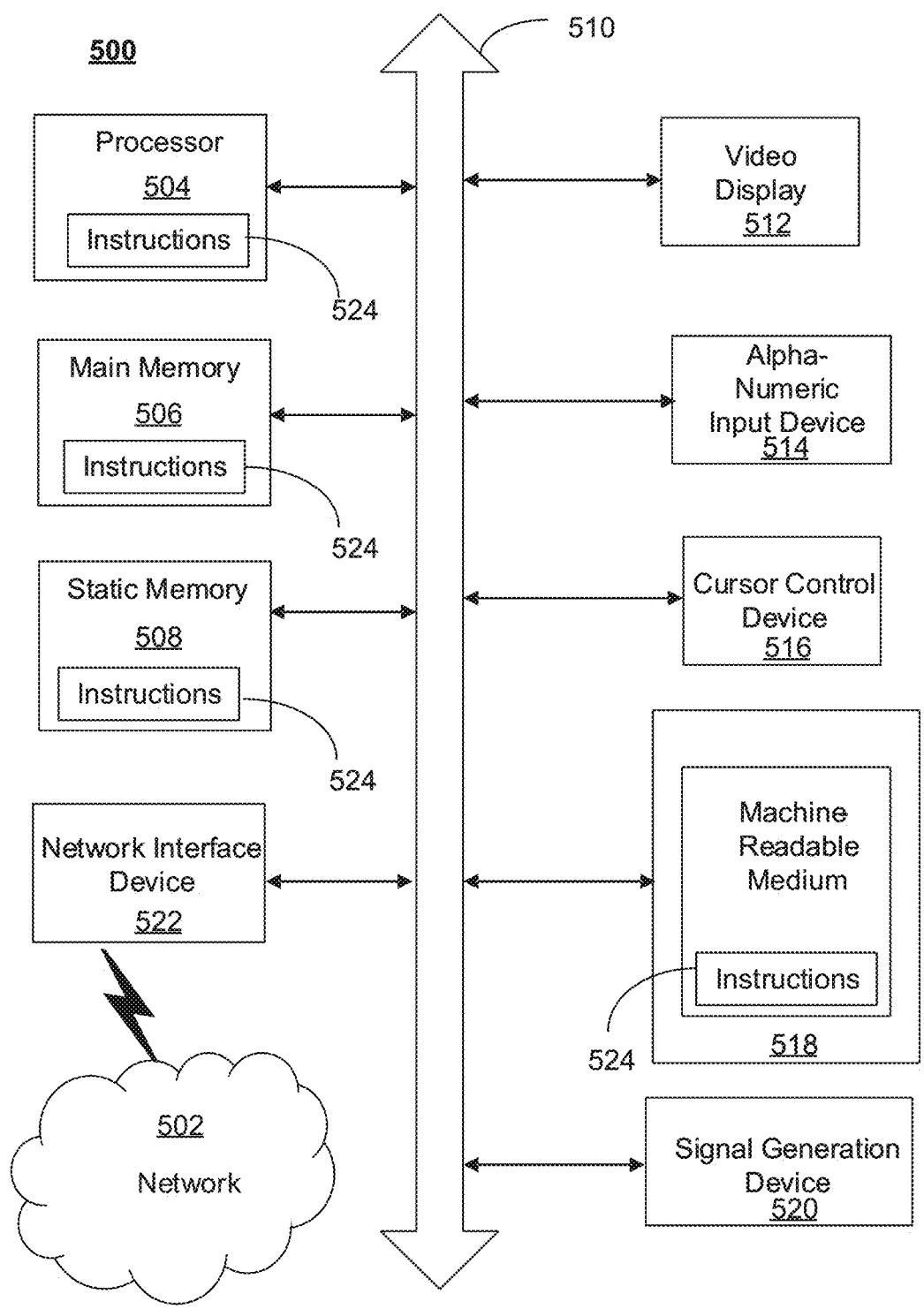
FIG. 8 depicts an exemplary communication system that provide wireless telecommunication services over wireless communication networks with which edge computing node may communicate.

FIG. 8 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video, or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 518 on which is stored one or more sets of instructions (e.g., software 524) embodying any one or more of the methods or functions described herein, including those methods illustrated above. Instructions 524 may also reside, completely or at least partially, within main memory 506, static memory 508, or within processor 504 during execution thereof by the computer system 500. Main memory 506 and processor 504 also may constitute tangible computer-readable storage media.

Figure 9:
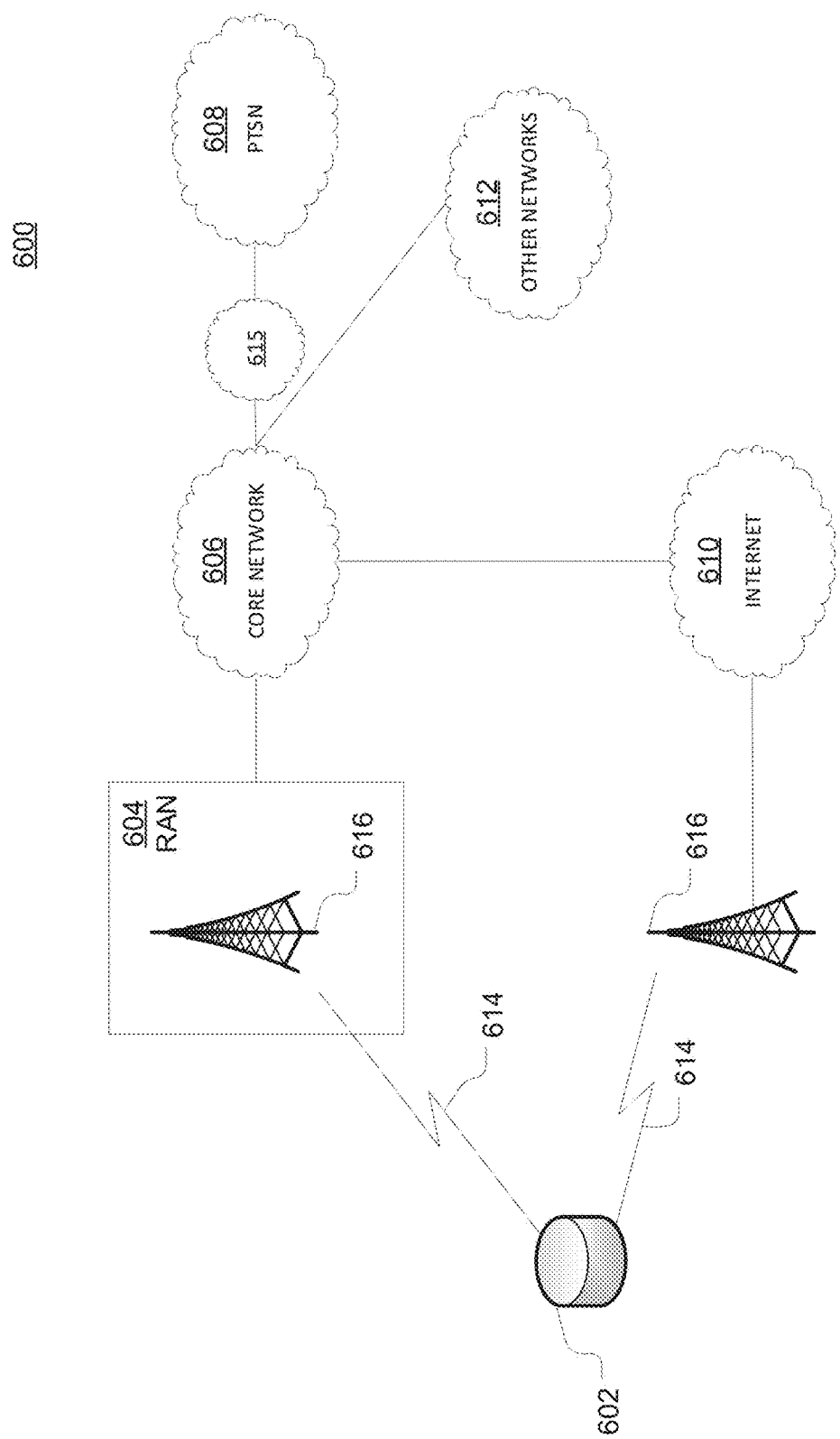
FIG. 9 is a diagram of an exemplary telecommunications system in which the disclosed methods and processes may be implemented with which edge computing node may communicate.

As shown in FIG. 9, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise IoT devices 32, mobile devices 33, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNodeB, a Home Node B, a Home eNodeB, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNodeB, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 9, base station 616 may have a direct connection to Internet 610. Thus, base station 616 may not be required to access Internet 610 via core network 606.

RAN 604 may be in communication with core network 606, which may be any type of network configured to provide voice, data, applications, or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 9, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. For example, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 10:
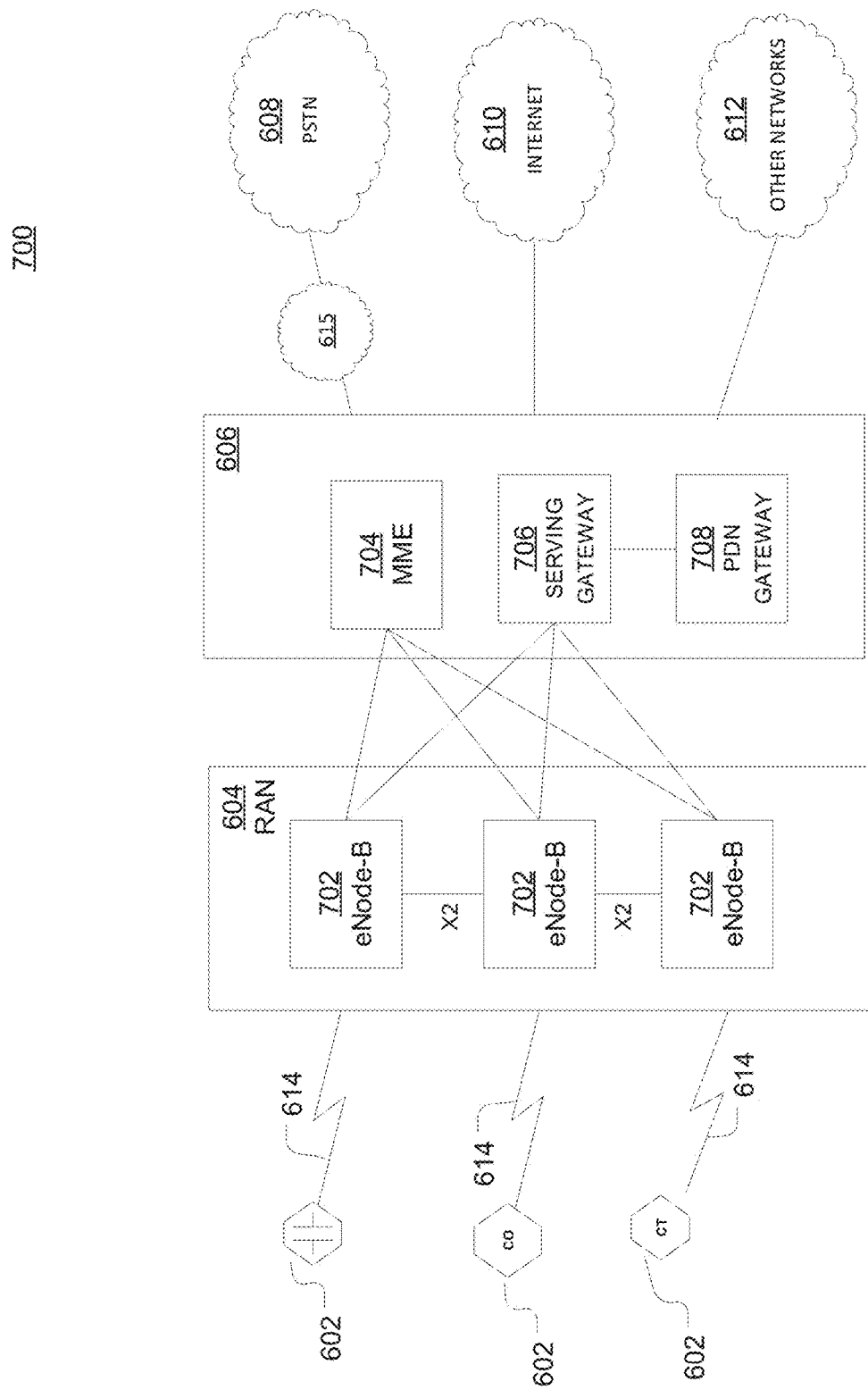
FIG. 10 is an example system diagram of a radio access network and a core network with which edge computing node may communicate.

FIG. 10 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNodeBs 702 while remaining consistent with the disclosed technology. One or more eNodeBs 702 may include one or more transceivers for communicating with the WTRUs 602 over air interface 614. Optionally, eNodeBs 702 may implement MIMO technology. Thus, one of eNodeBs 702, for example, may use multiple antennas to transmit wireless signals to, or receive wireless signals from, one of WTRUs 602.

Each of eNodeBs 702 may be associated with a particular cell (not shown) and may be configured to handle radio resource management decisions, handover decisions, scheduling of users in the uplink or downlink, or the like. As shown in FIG. 10 eNodeBs 702 may communicate with one another over an X2 interface.

Core network 606 shown in FIG. 10 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNodeBs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNodeBs 702 in RAN 604 via the S1 interface. Serving gateway 706 may generally route or forward user data packets to or from the WTRUs 602. Serving gateway 706 may also perform other functions, such as anchoring user planes during inter-eNodeB handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 11:
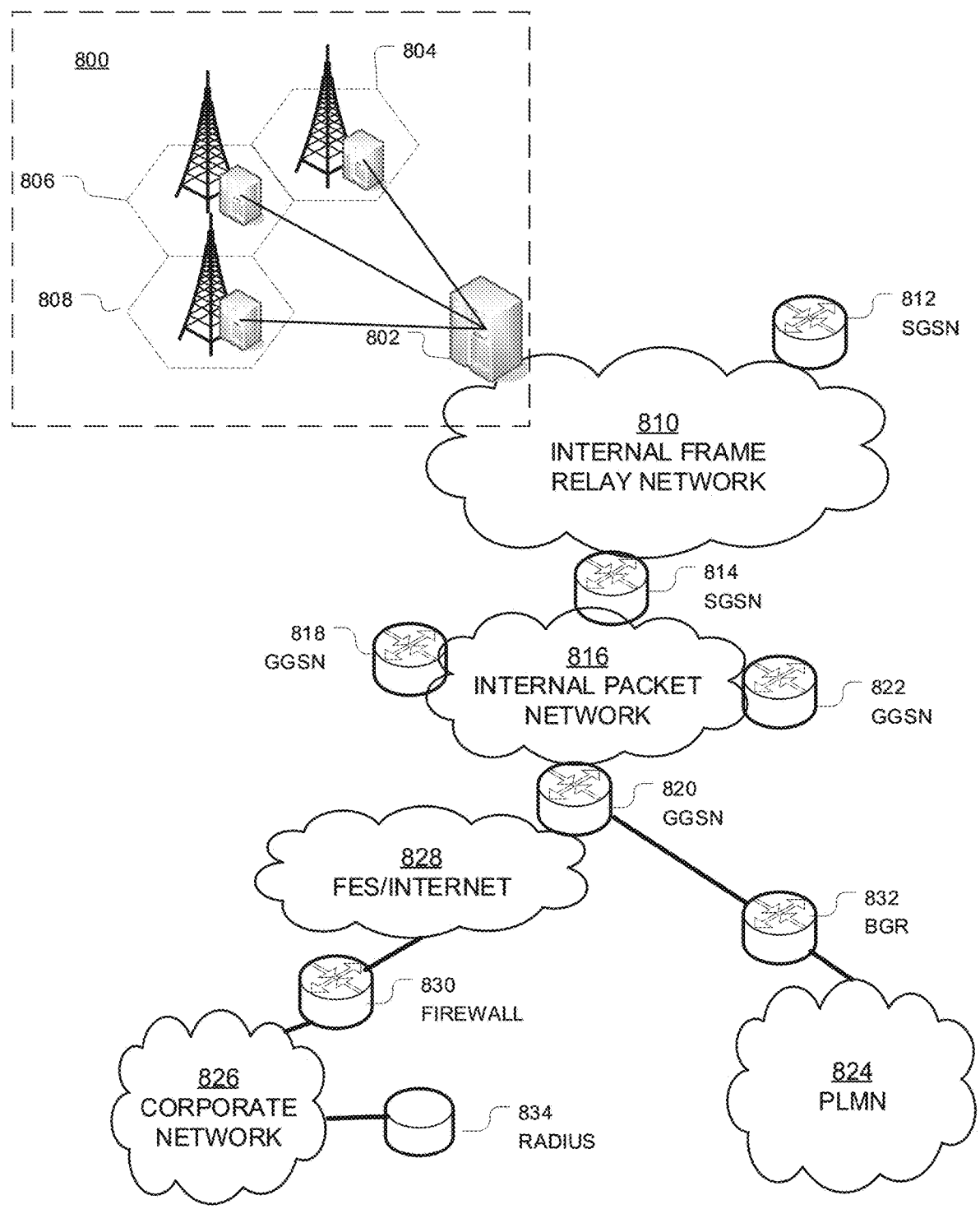
FIG. 11 depicts an overall block diagram of an example packet-based mobile cellular network environment, such as a general packet radio service (GPRS) network, with which edge computing node may communicate.

FIG. 11 depicts an overall block diagram of an example packet-based mobile cellular network environment, such as a GPRS network as described herein. In the example packet-based mobile cellular network environment shown in FIG. 11, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 12:
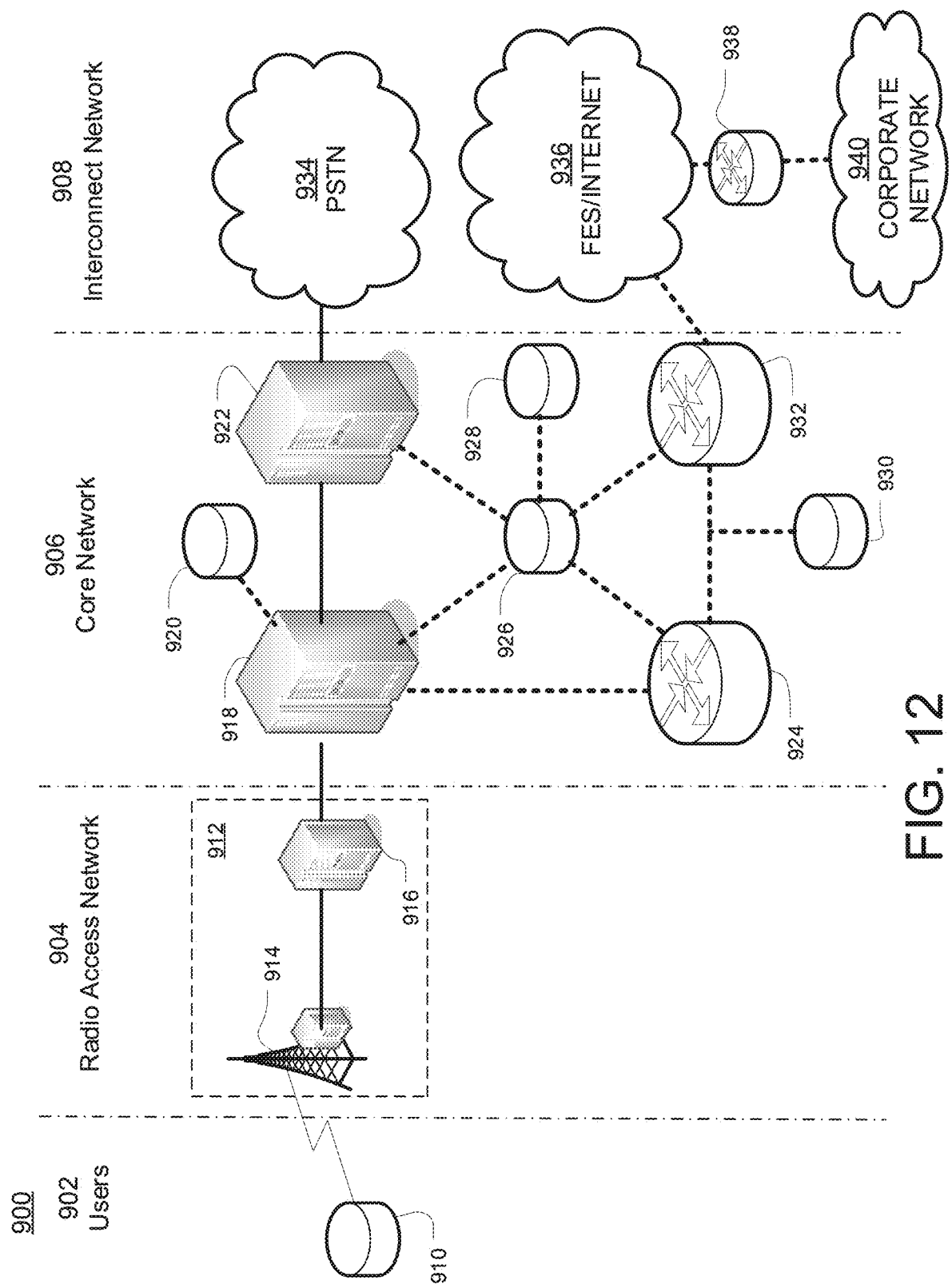
FIG. 12 illustrates an exemplary architecture of a GPRS network with which edge computing node may communicate.

FIG. 12 illustrates an architecture of a typical GPRS network 900 as described herein. The architecture depicted in FIG. 12 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 12. In an example, device 910 comprises a communications device (e.g., IoT devices 32, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 12, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 12, interconnect network 908 comprises a PSTN 934, a FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 12, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 13:
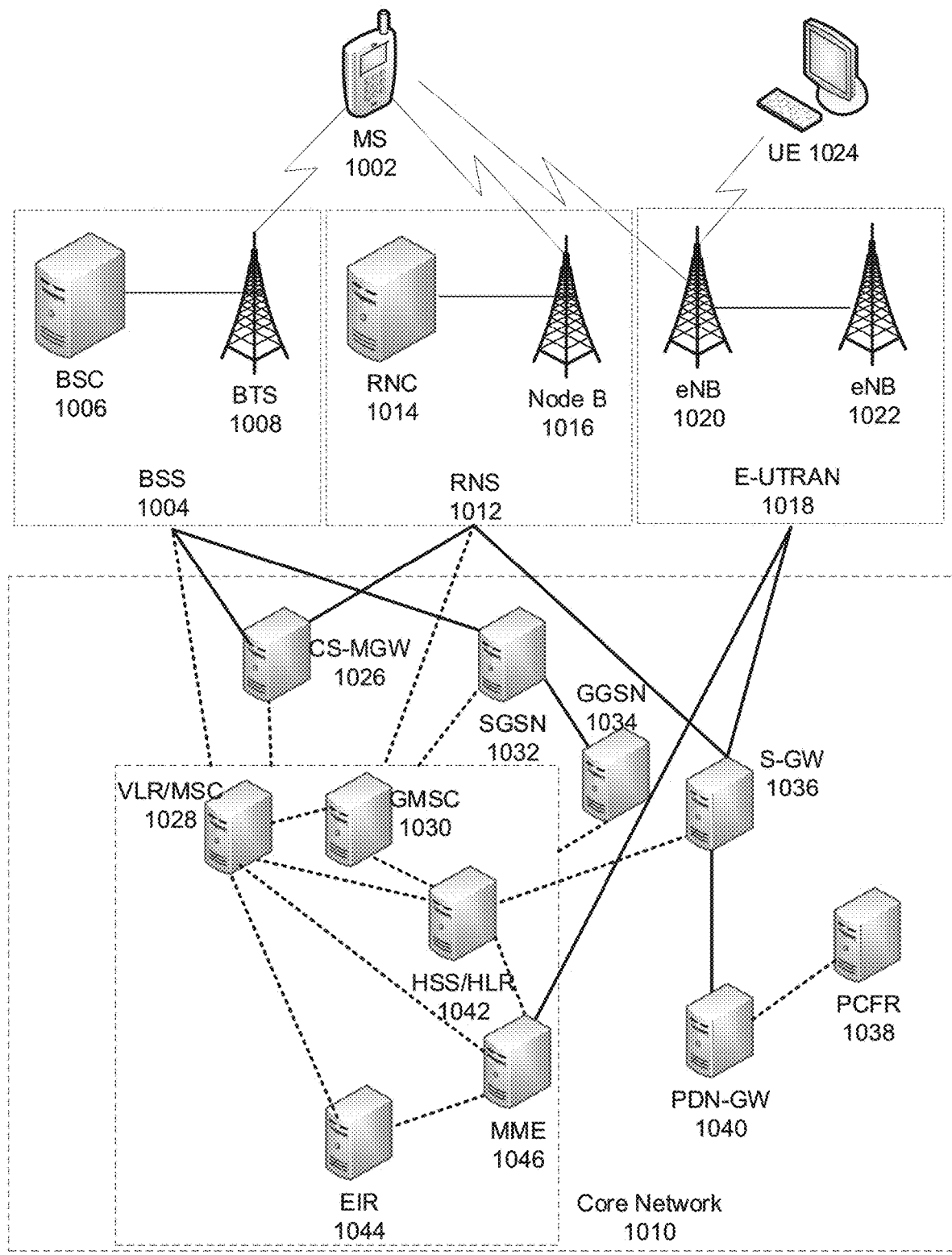
FIG. 13 is a block diagram of an exemplary public land mobile network (PLMN) with which edge computing node may communicate.

FIG. 13 illustrates a PLMN block diagram view of an example architecture that may be replaced by a telecommunications system. In FIG. 13, solid lines may represent user traffic signals, and dashed lines may represent support signaling. MS 1002 is the physical equipment used by the PLMN subscriber. For example, IoT devices 32, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically, MS 1002 may communicate with any or all of BSS 1004, RNS 1012, or E-UTRAN 1018. In an illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed, or handled independently of all other packets in the PS domain and does not require dedicated network resources.

The circuit-switched MGW function (CS-MGW) 1026 is part of core network 1010 and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. An MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. An MME 1046 is a control node which may track MS 1002 or UE 1024 if the devices are idle. Additional functionality may include the ability of MME 1046 to contact idle MS 1002 or UE 1024 if retransmission of a previous session is required.

While examples of described telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

The invention claimed is:

1. A device, the device comprising:
a processor; and
a memory coupled with the processor, the memory storing executable instructions that when executed by the processor, cause the processor to effectuate operations comprising:
monitoring enterprise network traffic associated with one or more user equipment (UE), wherein the enterprise network traffic is associated with a multi-access edge computing (MEC) control plane and a MEC user plane;
comparing the enterprise network traffic to a respective UE profile associated with each of the one or more UE;
determining whether the comparing indicates that a predetermined threshold has been exceeded, resulting in an indication; and
in response to the indication indicating that the predetermined threshold has been exceeded, generating an alert, wherein exceeding the predetermined threshold is indicative of a denial of service attack on an enterprise network or an attempt to remove enterprise data via the one or more UE.

2. The device of claim 1, wherein the processor further effectuates operations comprising in response to the indication indicating that the predetermined threshold has been exceeded, performing one or more mitigation actions on the one or more UE or performing one or more policies on the one or more UE.

3. The device of claim 1, wherein the device is operatively coupled to a MEC device.

4. The device of claim 1, wherein the processor further effectuates operations comprising monitoring performance telemetry data associated with the one or more UE.

5. The device of claim 1, wherein the one or more UE comprises one or more Internet-of-things (IoT) devices and one or more mobile devices.

6. The device of claim 1, wherein the UE profile comprises a time first data is sent to or received by the one or more UE, and data sizes for second data sent to or received by the one or more UE.

7. A computer-implemented method comprising:
monitoring, by a processor, enterprise network traffic associated with one or more user equipment (UE), wherein the enterprise network traffic is associated with a multi-access edge computing (MEC) control plane and a MEC user plane;
comparing, by the processor, the enterprise network traffic to a UE profile associated with each of the one or more UE;
determining, by the processor, whether the comparing indicates that a predetermined threshold has been exceeded, resulting in an indication; and
in response to the indication indicating that the predetermined threshold has been exceeded, generating, by the processor, an alert, wherein exceeding the predetermined threshold is indicative of a denial of service attack on an enterprise network or an attempt to remove enterprise data via the one or more UE.

8. The computer-implemented method of claim 7, further comprising in response to the indication indicating that the predetermined threshold has been exceeded, performing one or more mitigation actions on the one or more UE or performing one or more policies on the one or more UE.

9. The computer-implemented method of claim 7 further comprising monitoring performance telemetry data associated with the one or more UE.

10. The computer-implemented method of claim 7, wherein the one or more UE comprises one or more Internet-of-things (IoT) devices and one or more mobile devices.

11. The computer-implemented method of claim 7, wherein the UE profile comprises a time first data is sent to or received by the one or more UE and data sizes for second data sent to or received by the one or more UE.

12. A tangible computer-readable storage medium storing executable instructions that when executed by a processor causes said processor to effectuate operations comprising:
monitoring enterprise network traffic associated with one or more user equipment (UE) wherein the enterprise network traffic is associated with a multi-access edge computing (MEC) control plane and a MEC user plane;
comparing the enterprise network traffic to a UE profile associated with each of the one or more UE;
determining whether the comparing indicates that a predetermined threshold has been exceeded, resulting in an indication; and
in response to the indication indicating that the predetermined threshold has been exceeded, generating an alert, wherein exceeding the predetermined threshold is indicative of a denial of service attack on an enterprise network or an attempt to remove enterprise data via the one or more UE.

13. The tangible computer-readable storage medium of claim 12, wherein the processor further effectuates operations comprising in response to the indication indicating that the predetermined threshold has been exceeded, performing one or more mitigation actions on the one or more UE or performing one or more policies on the one or more UE.

14. The tangible computer-readable storage medium of claim 12, wherein the processor is operatively coupled to a multi-access edge computing (MEC) device.

15. The tangible computer-readable storage medium of claim 12, wherein the processor further effectuates operations comprising monitoring performance telemetry data associated with the one or more UE.

16. The tangible computer-readable storage medium of claim 12, wherein the one or more UE comprises one or more Internet-of-things (IoT) devices and one or more mobile devices.

17. The tangible computer-readable storage medium of claim 12, wherein the UE profile comprises a time first data is sent to or received by the one or more UE and data sizes for second data sent to or received by the one or more UE.

18. The tangible computer-readable storage medium of claim 17, wherein the UE profile further comprises an indication of where third data is received from by the one or more UE.

19. The tangible computer-readable storage medium of claim 17, wherein the UE profile further comprises an indication of UE attachment or detachment rates.

20. The tangible computer-readable storage medium of claim 12, wherein the one or more UE includes a wireless camera, a smart television, a smart appliance, or any combination thereof.

* * * * *